W. F. KENNEY.
SCREW BOLT.
APPLICATION FILED JULY 16, 1909.
987,142.
Patented Mar. 21, 1911.
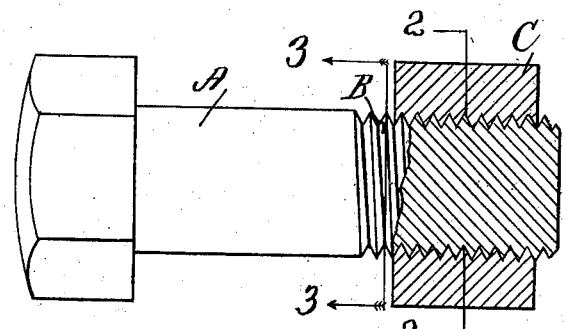
Fig. 1
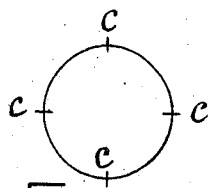
Fig. 7
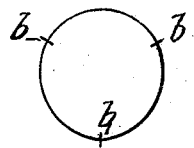
Fig. 6
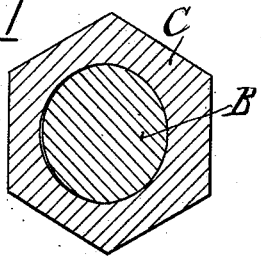
Fig. 2
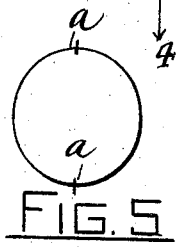
Fig. 5
Fig. 3
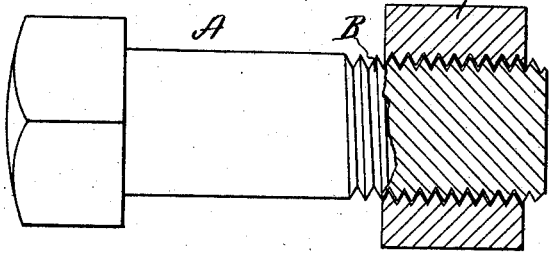
Fig. 4
WITNESSES
Benjamin L. Dennis.
Edw H Adams
INVENTOR
William F. Kenney
per A Scholfield
ATTORNEY

UNITED STATES PATENT OFFICE.

WILLIAM F. KENNEY, OF PROVIDENCE, RHODE ISLAND.

SCREW-BOLT.

987,142.  Specification of Letters Patent.  Patented Mar. 21, 1911.

Application filed July 16, 1909. Serial No. 508,065.

*To all whom it may concern:*

Be it known that I, WILLIAM F. KENNEY, a citizen of the United States, residing at Providence, in the State of Rhode Island, have invented a new and useful Improvement in Screw-Bolts, of which the following is a specification.

The nature of my invention consists in a screw threaded bolt provided with a full cut thread having alternate longitudinally raised and depressed surfaces, whereby the threads of the nut will be caused to clasp the bolt tightly at the raised surfaces of the screw thread, and not tightly at the intermediate portions of the same, and thus by reason of the greater stress produced, serving to prevent the accidental loosening of the nut on the bolt.

In the accompanying drawing:—Figure 1 represents a side view and partial section of a screw threaded bolt embodying my improvement. Fig. 2 represents a transverse section taken through the bolt and nut in the line 2, 2 of Fig. 1. Fig. 3 represents a transverse section taken in the line 3, 3 of Fig. 1. Fig. 4 represents a top view and partial section of the bolt and nut when in the position shown in the first three figures of the drawing, the section being taken in the line 4, 4, of Fig. 3. Figs. 5, 6 and 7 represent examples of the different forms of cross section which may be employed in the screw threaded portion of bolts when carrying out my invention.

In the drawing, A represents the body of the bolt, and B the screw-threaded portion of the same, the said screw threaded portion B having a cross-sectional contour as shown in either of the figures 5, 6, or 7, whereby the threads of the cylindrical bore of the nut C will bear very tightly at the high points $a$, $a$, in Fig. 5, $b$, $b$, $b$, in Fig. 6, and $c$, $c$, $c$, $c$, in Fig. 7, the clasping strain of the tight threads being thus localized and not distributed over an entire cylindrical contour, as in an ordinary cylindrical screw threaded bolt.

In the manufacture of the improved bolt, I prefer to hold the bolt in a chuck the spindle of which has a slight lateral movement and after first turning up the surface I cut thereon a full screw thread, without removing the bolt from the chuck.

When a tightly fitting nut is being screwed onto the belt it will be caused to yield at the increased diameter of the high portions of the periphery of the bolt, with a resulting progressive change in the diametrical form of the nut, and a like diametrical change in the form of the nut must be forcibly effected, in order to effect its withdrawal from the bolt; hence the reverse movement of the nut upon the bolt will be prevented.

I claim as my invention:—

1. A screw bolt, having a full screw thread cut thereon, with longitudinal portions of its threaded periphery at a greater distance from the axis of the bolt than the intervening portions, whereby the nut can be retained upon the bolt, substantially as described.

2. The combination of a screw bolt having a full screw thread cut thereon, with longitudinal portions of the threaded periphery at a greater distance from the axis of the bolt than the intervening portions, with a nut held upon the bolt substantially as described.

WILLIAM F. KENNEY.

Witnesses:
SOCRATES SCHOLFIELD,
BENJAMIN L. DENNIS.

---

Copies of this patent may be obtained for five cents each, by addressing the "Commissioner of Patents, Washington, D. C."